(12) United States Patent
Fang

(10) Patent No.: US 10,248,600 B2
(45) Date of Patent: Apr. 2, 2019

(54) REMOTE CONTROL SYSTEM

(71) Applicants: INVENTEC (PUDONG) TECHNOLOGY CORPORATION, Shanghai (CN); INVENTEC CORPORATION, Taipei (TW)

(72) Inventor: Lanlan Fang, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 130 days.

(21) Appl. No.: 15/382,420

(22) Filed: Dec. 16, 2016

(65) Prior Publication Data

US 2017/0177525 A1 Jun. 22, 2017

(30) Foreign Application Priority Data

Dec. 16, 2015 (CN) .......................... 2015 1 0947317

(51) Int. Cl.
*G06F 13/42* (2006.01)
*G06F 13/38* (2006.01)
*G06F 13/40* (2006.01)
*G06F 15/78* (2006.01)
*H04L 29/08* (2006.01)

(52) U.S. Cl.
CPC ........ *G06F 13/387* (2013.01); *G06F 13/4022* (2013.01); *G06F 13/4282* (2013.01); *G06F 15/7825* (2013.01); *H04L 69/323* (2013.01)

(58) Field of Classification Search
CPC .............. G06F 13/387; G06F 13/4022; G06F 13/4282; G06F 15/7825; H04L 69/323
See application file for complete search history.

(56) References Cited

U.S. PATENT DOCUMENTS 9,130,824 B2 * 9/2015 Bhatia ..................... G06F 13/42
2015/0074303 A1 * 3/2015 Zou ..................... G06F 13/4286
710/106

* cited by examiner

*Primary Examiner* — Idriss N Alrobaye
*Assistant Examiner* — Richard B Franklin
(74) *Attorney, Agent, or Firm* — Maschoff Brennan

(57) ABSTRACT

A remote control system includes computing boards and a control board. The control board includes a first network physical layer protocol conversion chip, a network signal switch module and a network signal processing module. The control board is electrically connected to the computing boards and communicated with a remote control manager. The first network physical layer protocol conversion chip is electrically connected to the remote control manager. The network signal switch module is electrically connected to the first network physical layer protocol conversion chip and the computing boards. The network signal processing module is electrically connected to the network signal switch module.

8 Claims, 3 Drawing Sheets

REMOTE CONTROL SYSTEM

CROSS-REFERENCE TO RELATED APPLICATIONS

This non-provisional application claims priority under 35 U.S.C. § 119(a) on Patent Application No(s). 201510947317.0 filed in China on Dec. 16, 2015, the entire contents of which are hereby incorporated by reference.

BACKGROUND OF THE INVENTION

Technical Field of the Invention

The invention relates to a remote control system, more particularly to a remote control system for a microserver.

Description of the Related Art

High-density microserver is a new Shared Infrastructure, which is configured for specifically data center. The high-density microserver with a lot of low-power servers has higher performance than the one equipped with a few quantity of high-power servers.

However, the microserver with the lots of low-power servers is usually equipped with a lot of computing boards which occupy space, as well as requires a great amount of control components and complicated control systems for controlling the computing boards, thereby increasing energy consumption and the cost of the microserver.

SUMMARY

One embodiment of the invention provides a remote control system for a microserver. The remote control system comprises a plurality of computing boards and a control board. The computing boards are for processing data of the microserver. The control board is electrically connected to the plurality of computing boards and communicated with a remote control manager. The control board converts network signals transmitted between the computing boards and the remote control manager. The computing boards are remote-controlled by the remote control manager through the control board. The control board comprises a first network physical layer protocol conversion chip, a network signal switch module and a network signal processing module. The first network physical layer protocol conversion chip is electrically connected to the remote control manager. The first network physical layer protocol conversion chip transmits a first network signal transmitted via the remote control. The first network physical layer protocol conversion chip transforms the first network signal to an internal signal or transforms the internal signal to the first network signal. The network signal switch module is electrically connected to the first network physical layer protocol conversion chip and the computing boards. The network signal switch module receives the internal signal from the first network physical layer protocol conversion chip. The network signal switch module transforms the internal signal to a second network signal or transforms the second network signal to the internal signal. The network signal processing module is electrically connected to the network signal switch module. The network signal processing module generates an executive instruction according to the internal signal received by the network signal switch module. The network signal switch module transmits the second network signal to at least one of the plurality of computing boards according to the executive instruction.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

Figure 1:
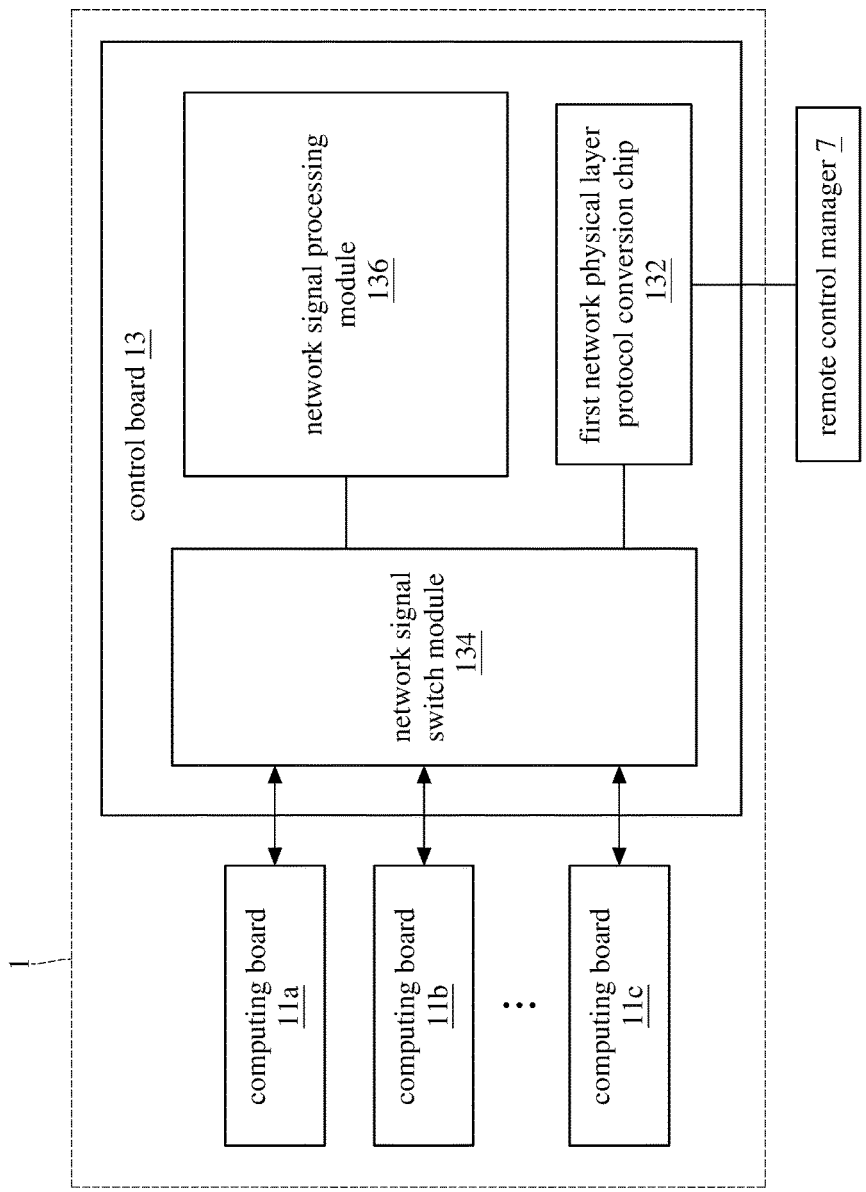
FIG. 1 is a functional block diagram of a remote control system in one embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a functional block diagram of a remote control system in one embodiment of the invention. In this embodiment, a remote control system 1 is configured for a microserver. The remote control system 1 includes computing boards 11a-11c and a control board 13. The control board 13 includes a first network physical layer protocol conversion chip 132, a network signal switch module 134 and a network signal processing module 136. For purposes of clear illustration and explanation, FIG. 1 only illustrates the computing boards 11a-11c. However, the present invention is not limited by the quantity of the computing boards 11a-11c, it is noted that the quantity of the computing boards can be altered according to actual requirement. In addition, in one embodiment, each of the computing board 11a, the computing board 11b, the computing board 11c is a server motherboard connecting to the control board 13. In one embodiment, each of the modules belong to the control board 13 is an integrated circuit chip. In another embodiment, the modules belong to the control board 13 are functional blocks in one integrated circuit chip.

The control board 13 is electrically connected to the computing boards 11a-11c and communicated with a remote control manager 7. The first network physical layer protocol conversion chip 132 is electrically connected to the remote control manager 7. The network signal switch module 134 is electrically connected to the first network physical layer protocol conversion chip 132 and the computing boards 11a-11c. The network signal processing module 136 is electrically connected to the network signal switch module 134. In one embodiment, the computing boards 11a-11c are able to be remote-controlled by a communication device through the control board 13. The communication device is, for example, a personal computer, tablet computer or another type of intelligent end device.

The computing boards 11a-11c are able to process data of the microserver. In this embodiment, each of the computing boards 11a-11c includes two system on chips (SoC). Each of the SoCs is able to work independently for supporting the operation of the microserver. However, the present invention is not limited to the configuration of the computing boards 11a-11c in above, person of ordinary skill in the art is able to alter the configuration of the computing boards 11a-11c according to actual requirement.

The control board 13 is able to convert network signals transmitted between the computing boards 11a-11c and the remote control manager 7. The remote control manager 7 and the computing boards 11a-11c are communicated with each other by the network signals. Specifically, the remote control manager 7 generates a first network signal for controlling the computing boards 11a-11c. One of the computing boards 11a-11c generates a second network signal for reporting information or requesting resource. The control board 13 is able to convert the format of the first network signal and the format of the second network signal. That is, the control board 13 is able to convert the format of the first network signal into the second network signal and able to convert the format of the second network signal into the first network signal. Thus, the control board 13 and the remote control manager 7 with different formats are able to communicate with each other.

In one embodiment, the computing boards 11a-11c transmit the aforementioned network signal to the control board 13 through a Serial Gigabit Media Independent Interface (SGMII). However, the present invention is not limited to that the computing boards 11a-11c are transmitting the network signal through the same interface. In other embodiments, the computing boards 11a-11c are able to transmit the network signal through different interfaces. The remote control port 7 is transmitting the aforementioned network signal to the control board 13132 through the first port The first network signal is transmitted between the first network physical layer protocol conversion chip 132 and the remote control manager 7. The first network physical layer protocol conversion chip 132 is able to transform the first network signal to an internal signal or transform the internal signal to the first network signal. Specifically, the first network physical layer protocol conversion chip 132 is able to transmit or receive the first network signal through the port. The port is, for example, a small form-factor pluggable plus (SFP+) port. In addition, the first network physical layer protocol conversion chip 132 is able to transmit or receive the aforementioned internal signal through a XFI interface. In other words, the first network physical layer protocol conversion chip 132 is able to convert physical layer signals between the SFI+ interface and the XFI interface. However, the present invention is not limited to the types of the aforementioned port and interface as used in the first network physical layer protocol conversion chip 132.

The internal signal is transmitted between the network signal switch module 134 and the first network physical layer protocol conversion chip 132. The network signal switch module 134 is able to transform the internal signal to the second network signal or transform the second network signal to the internal signal. In addition, the network signal switch module 134 is mutually transmitting the second network signal to at least one of the computing boards 11a-11c according to an executive instruction. Specifically, the network signal switch module 134 converts the internal signal from the first network physical layer protocol conversion chip 132 into the second network signal and transmits the second network signal to any one of the computing boards 11a-11c. The network signal switch module 134 receives the internal signal from any one of the computing boards 11a-11c. The network signal switch module 134 converts the received internal signal into the first network signal to the first network physical layer protocol conversion chip 132 and then to the remote control manager 7.

In detail, when the control board 13 receives the first network signal from the remote control manager 7, the control board 13 converts the first network signal into the second network signal and selectively transmits the second network signal to at least one of the computing boards 11a-11c according to the content of the received first network signal. When the control board 13 receives the first network signal from at least one of the computing boards 11a-11c, the control board 13 converts the second network signal into the first network signal and transmits the first network signal to the remote control manager 7 so that the remote control manager 7 obtains the status of the computing boards 11a-11c or the request from the computing boards 11a-11c.

Figure 2:
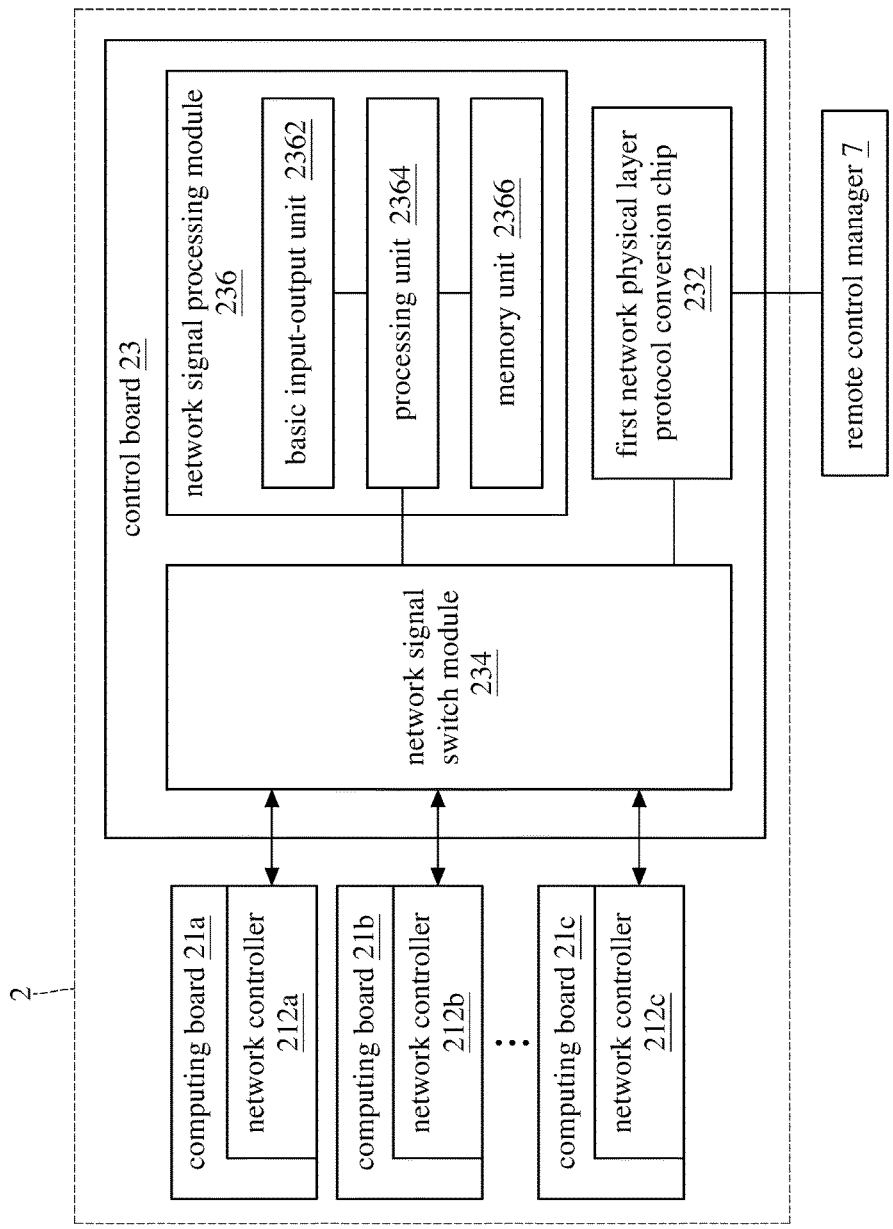
FIG. 2 is a functional block diagram of a remote control system in another embodiment of the invention.

Please refer to FIG. 2. FIG. 2 is a functional block diagram of a remote control system in another embodiment of the invention. As shown in FIG. 2, the remote control system 2 includes computing boards 21a-21c and a control board 23. The control board 23 includes a first network physical layer protocol conversion chip 232, a network signal switch module 234 and a network signal processing module 236. The control board 23 is electrically connected to the computing boards 21a-21c and communicated with a remote control manager 7.

In addition, the computing boards 21a-21c respectively includes network controllers 212a-212c. The network signal processing module 236 further includes a basic input-output unit 2362, a processing unit 2364 and a memory unit 2366. The processing unit 2364 is electrically connected to the basic input-output unit 2362 and the network signal switch module 234. The memory unit 2366 is electrically connected to the processing unit 2364. The processing unit 2364 is, for example, a central processing unit (CPU), an advanced RISC machine (ARM), or other device applicable for computing.

The network controllers 212a-212c are able to transmit at least one system data to the computing boards 21a-21c. Each of the network controllers 212a-212c has a plurality of ports connected to the network signal switch module 234. In one embodiment, each of the computing boards 21a-21c includes two SoCs. Each of the SoCs is corresponding to two of the ports of the network controllers 212a-212c. Thus, each of the computing boards 21a-21c has four of the aforementioned ports. However, the quantity of the SoCs and the quantity of the ports which each of the system on chips is corresponding to are altered according to actual requirement.

The basic input-output unit 2362 is able to store a configuration setting of the remote control system 2. The basic input-output unit 2362 is, for example, a chip operating the basic input/output system (BIOS) therein. The processing unit 2364 is communicated with the computing boards 21a-21c through the network signal switch module 234 for detecting network status of the computing boards 21a-21c. The processing unit 2364 generates an executive instruction according to the aforementioned configuration setting and internal signal. The processing unit 2364 transmits the executive instruction to the network signal switch module 234 to indicate the network signal switch module 234 to transmit the second network signal converted from the internal signal to at least one of the computing boards 21a-21c. The memory unit 2366 is able to temporary save staged data of the processing unit 2364. The memory unit 2366 is, for example, a double-data-rate three synchronous dynamic random access memory (DDR3 SDRAM).

Figure 3:
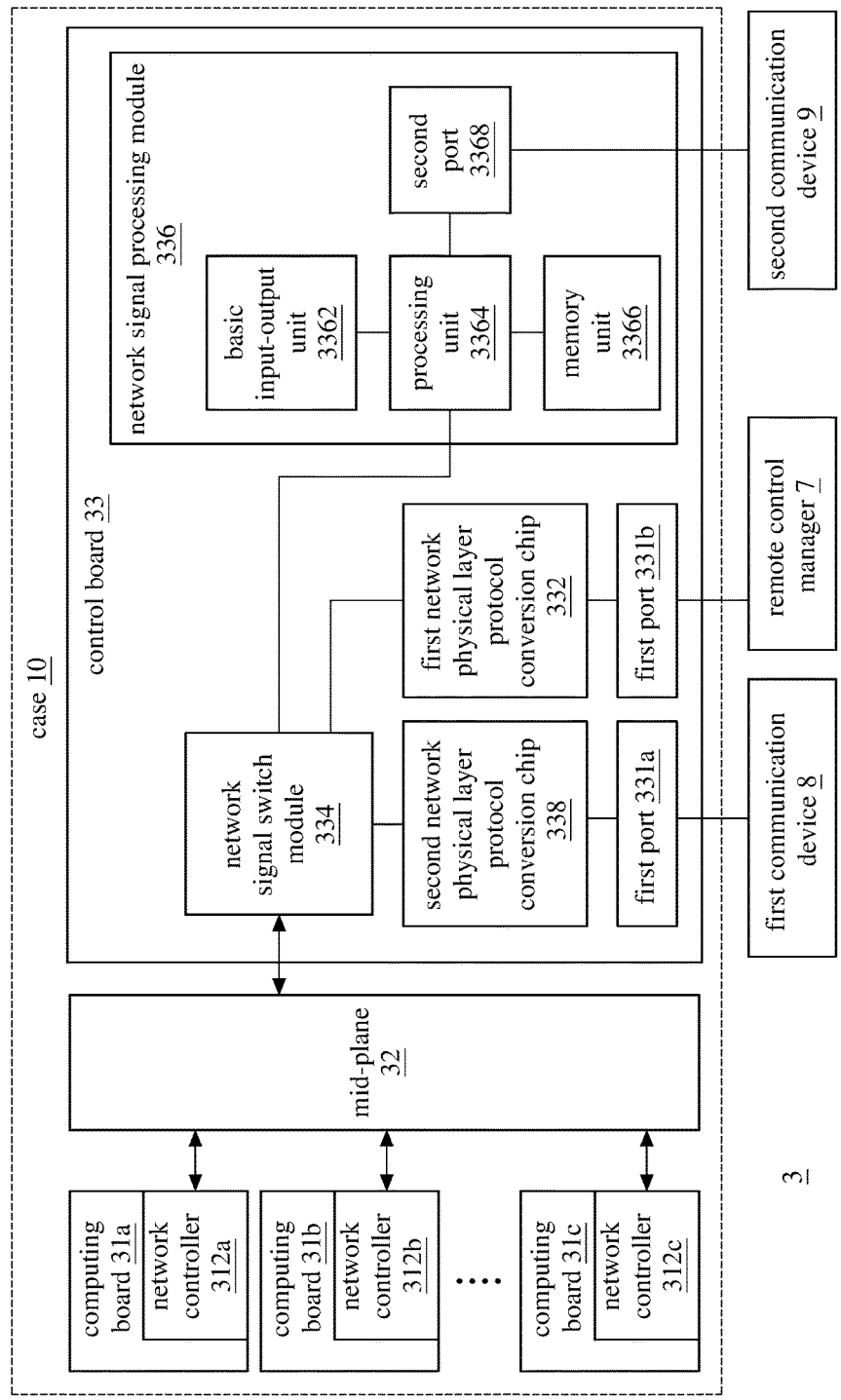
FIG. 3 is a functional block diagram of a remote control system in another embodiment of the invention.

Please refer to FIG. 3, which is a functional block diagram of a remote control system in another embodiment of the invention. As shown in FIG. 3, the remote control system 3 includes computing boards 31a-31c and a control board 33. The control board 33 includes a first network physical layer protocol conversion chip 332, a network signal switch module 334 and a network signal processing module 336. The control board 33 is connected to a remote control manager 7, a first communication device 8 and a second communication device 9. In addition, the computing boards 31a-31c respectively includes network controllers 312a-312c. The network signal processing module 336 includes a basic input-output unit 3362, a processing unit 3364 and a memory unit 3366. The processing unit 3364 is electrically connected to the basic input-output unit 3362 and the network signal switch module 334. The memory unit 3366 is electrically connected to the processing unit 3364. The network controllers 312a-312c are electrically connected to the network signal switch module 334 for respectively transmitting at least one system data to the computing boards 31a-31c.

Furthermore, the control board 33 further includes a second network physical layer protocol conversion chip 338 and at least two first ports 331a and 331b. The first ports 331a and 331b are electrically connected to the first network physical layer protocol conversion chip 332 and the second network physical layer protocol conversion chip 338, respectively. The first network physical layer protocol conversion chip 332 is communicated with the remote control manager 7 through the first port 331b. The second network physical layer protocol conversion chip 338 is electrically connected to the network signal switch module 334 and the first communication device 8. And the second network physical layer protocol conversion chip 338 is electrically connected to the first communication device through the first port 331a.

There is a third network signal transmitted between the second network physical layer protocol conversion chip 338 and the first communication device 8. The second network physical layer protocol conversion chip 338 is able to transform the third network signal to the internal setting signal or transform the internal setting signal to the third network signal. The internal setting signal is transmitted between the second network physical layer protocol conversion chip 338 and the network signal switch module 334 so as to adjust basic parameters of the network signal switch module 334. In other words, the third network signal includes the basic parameters of the network signal switch module 334 for adjusting or debugging the network signal switch module 334.

Moreover, the network signal processing module 336 further includes a second port 3368. The second port 3368 is electrically connected to the processing unit 3364 and the second communication device 9. The network signal processing module 336 is communicated with the second communication device 9 through the second port 3368. The network signal processing module 336 receives allocation parameters from the second communication device 9 for changing the configuration setting of the basic input-output unit 2362. The second port 3368 is, for example, a universal serial bus (USB) or a component object model (COM) interface.

In one embodiment, the second network physical layer protocol conversion chip 338 is connected to the first port 331a through a Media Device Interface (MDI). Each of the first port 331a and 331b is, for example, a Registered Jack 45 (RJ-45) port is able to transmit the third network signal. The second network physical layer protocol conversion chip 338 is electrically connected to the network signal switch module 334 through a Serializer/Deserializer (SerDes) interface for transmitting the internal setting signal to the network signal switch module 334. In other words, the second network physical layer protocol conversion chip 338 is able to mutually convert the signal formats of the MDI interface into the SerDes interface. However, the invention is not limited to the second network physical layer protocol conversion chip 338 and the third network signal as discussed in above.

In one embodiment, the control board 3 further includes a first substrate and a second substrate. The first substrate and the second substrate are the printed circuit boards in the control board 3, but the present disclosure is not limited thereto. The second substrate is disposed on the first substrate. In detail, the first network physical layer protocol conversion chip 332 and the network signal switch module 334 are disposed on the first substrate. The network signal processing module 336 is disposed on the second substrate. Specifically, one side of the second substrate is parallel plugged to the first substrate so that the second substrate is electrically connected to the first network physical layer protocol conversion chip 332 and the network signal switch module 334. The present invention is not limited to the size and the material of the first substrate 34 and the second substrate 35.

In other embodiments, the remote control system 3 further includes a mid-plane 32. The computing boards 31a-31c and the control board 33 are plugged to the mid-plane 32. In other words, the control board 33 is electrically connected to the computing boards 31a-31c through the mid-plane 32. The control board 33, the mid-plane 32 and the computing boards 31a-31c are located in the same case 10.

According to the remote control system as discussed above, the first network physical layer protocol conversion chip converts the formats of signals, and the network signal switch module transmits the converted signals to any one of the computing boards in the remote control system. Thus, the remote control system is able to control all the computing boards of the microserver. That is, all the computing boards share the same remote control system as discussed above. Thus, the quantity of the control component required for the microserver is reduced, which occupies less space, as well as the energy consumption and the cost of the microserver are reduced.

What is claimed is:
1. A remote control system for a microserver, the remote control system comprising:
  a plurality of computing boards is for processing data of the microserver;
  a control board electrically connected to the plurality of computing boards and communicated with a remote control manager, the control board converting network signals transmitted between the plurality of computing boards and the remote control manager, the plurality of computing boards being remote-controlled by the remote control manager through the control board, and the control board comprising:
    a first network physical layer protocol conversion chip electrically connected to the remote control manager, and the first network physical layer protocol conversion chip transmitting a first network signal via the remote control, the first network physical layer protocol conversion chip transforming the first network signal to an internal signal or transforming the internal signal to the first network signal;
    a network signal switch module electrically connected to the first network physical layer protocol conversion chip and the plurality of computing boards, the network signal switch module receiving the internal signal from the first network physical layer protocol conversion chip, the network signal switch module transforming the internal signal to a second network signal or transforming the second network signal to the internal signal; and a network signal processing module electrically connected to the network signal switch module, the network signal processing module generating an executive instruction according to the internal signal received by the network signal switch module, and the network signal switch module transmitting the second network signal to at least one of the plurality of computing boards according to the executive instruction, wherein the network signal processing module comprising a basic input-output unit, a processing unit and a memory unit, the basic input-output unit stores a configuration setting of the remote control system, the processing unit is electrically connected to the basic input-output unit and the network signal switch module, and the processing unit communicates with the plurality of computing boards through the network signal switch module to detect network status of the plurality of computing boards, the processing unit produces and transmits the executive instruction to the network signal switch module according to the configuration setting of the remote control system and the internal signal so that the network signal switch module transmits the second network signal to at least one of the plurality of computing boards according to the executive instruction, the memory unit is electrically connected to the processing unit and temporary saves staged data of the processing unit.

2. The remote control system according to claim 1, wherein the network signal processing module comprises at least one second port, the network signal processing module is communicated with a second communication device through the at least one second port, and the network signal processing module receives an allocation parameter transmitted from the second communication device to change the configuration setting.

3. The remote control system according to claim 1, wherein the control board comprises a second network physical layer protocol conversion chip, the second network physical layer protocol conversion chip is electrically connected to the network signal switch module and a first communication device, a third network signal is transmitted between the second network physical layer protocol conversion chip and the first communication device, the second network physical layer protocol conversion chip transforms the third network signal to an internal setting signal or transforms the internal setting signal to the third network signal, and the second network physical layer protocol conversion chip transmits the internal setting signal to the network signal switch module so as to adjust basic parameters of the network signal switch module.

4. The remote control system according to claim 3, wherein the control board further comprises at least two first ports, the at least two first ports electrically connected to the first network physical layer protocol conversion chip and the second network physical layer protocol conversion chip, respectively, the second network physical layer protocol conversion chip is electrically connected to the first communication device through the at least two first ports, the first network physical layer protocol conversion chip is connected to a network cable through the at least two first ports for communicating with the remote control manager.

5. The remote control system according to claim 1, wherein the control board comprises a first substrate, the first network physical layer protocol conversion chip and the network signal switch module are located on the first substrate, the network signal processing module is disposed on the second substrate, the second substrate is parallel plugged to the first substrate so that the second substrate is electrically connected to the first network physical layer protocol conversion chip and the network signal switch module.

6. The remote control system according to claim 1, further comprising a mid-plane, the plurality of computing boards and the control board plugged to the mid-plane, respectively, and the control board electrically connected to the plurality of computing boards through the mid-plane.

7. The remote control system according to claim 6, wherein the control board, the mid-plane and the plurality of computing boards are located in a same case.

8. The remote control system according to claim 1, wherein each of the plurality of computing boards is equipped with a network controller transmitting at least one system data to the plurality of computing boards.

* * * * *